A. J. STRAUSS

June 17, 1930. SHOW CASE FOR STORE DOORS Re. 17,702

Original Filed Jan. 11, 1926 2 Sheets-Sheet 1

INVENTOR.
Alfred J. Strauss.
BY E. J. Clarkson
ATTORNEYS.

A. J. STRAUSS
June 17, 1930. SHOW CASE FOR STORE DOORS Re. 17,702
Original Filed Jan. 11, 1926 2 Sheets-Sheet 2
Fig. 4.
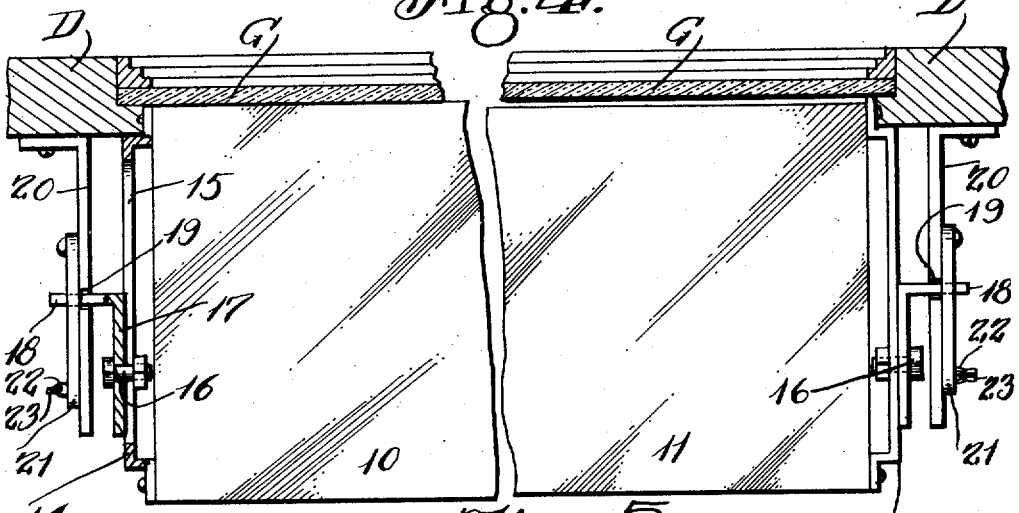
Fig. 5.
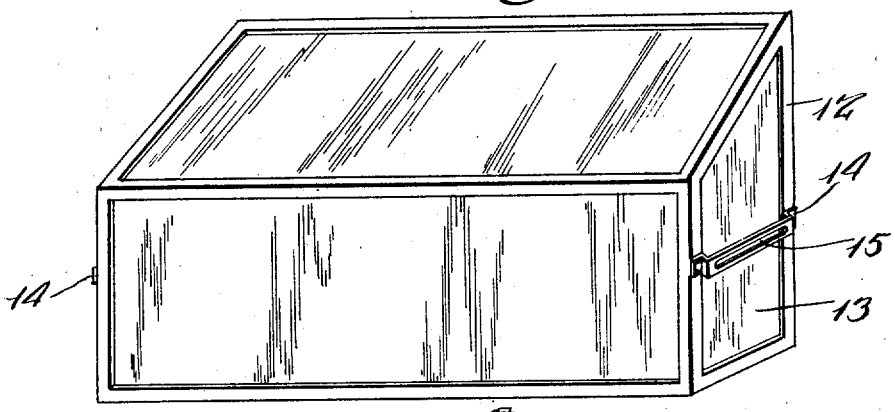
Fig. 6.
Fig. 7.
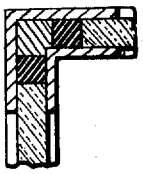
Fig. 8.
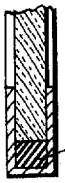
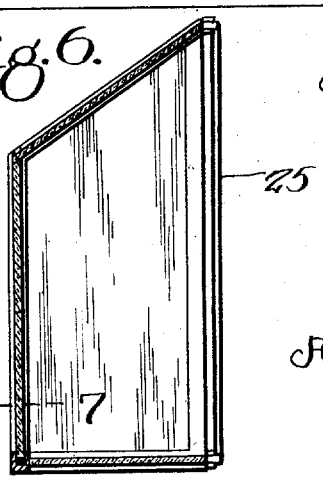
INVENTOR.
Alfred J. Strauss.
BY E. J. Markson
ATTORNEYS.

Reissued June 17, 1930 Re. 17,702

UNITED STATES PATENT OFFICE

ALFRED J. STRAUSS, OF LOUISVILLE, KENTUCKY, ASSIGNOR, BY MESNE ASSIGNMENTS, TO E. W. ELITHORPE, OF MINNEAPOLIS, MINNESOTA

SHOW CASE FOR STORE DOORS

Original No. 1,594,385, dated August 3, 1926, Serial No. 80,612, filed January 11, 1926. Application for reissue filed August 1, 1928. Serial No. 296,820.

This invention relates to show cases and has special reference to a show case designed to fit on a store door, window or the like, but more particularly for store doors having glass panels.

The principal object of the invention is to provide an improved form of show case which may be attached to any store door, may be of any desired height or cross sectional dimensions, may either have a solid or transparent backing or may be opaque; may be readily placed on or removed from the display position at the will of the owner or manager of the store and when placed in position may be kept from surreptitious removal.

With the above and other objects in view as will be hereinafter apparent, the invention consists in general of certain novel details of construction and combinations of parts hereinafter fully described, illustrated in the accompany drawings and specifically claimed.

In the accompanying drawings like characters of reference indicate like parts in the several views, and:

Figure 4 is an enlarged plan view, partly in section, showing the device applied to the store door, the central part of the device being broken away to accommodate the scale of the view.

Figure 5 is a perspective view of a form of the invention using glass panelling.

Figure 6 is a transverse section therethrough.

Figure 7 is a detail section to an enlarged scale on the line 7—7 of Figure 6.

Figure 8 is a detail section showing the cushioning of the back glass.

Figure 1:
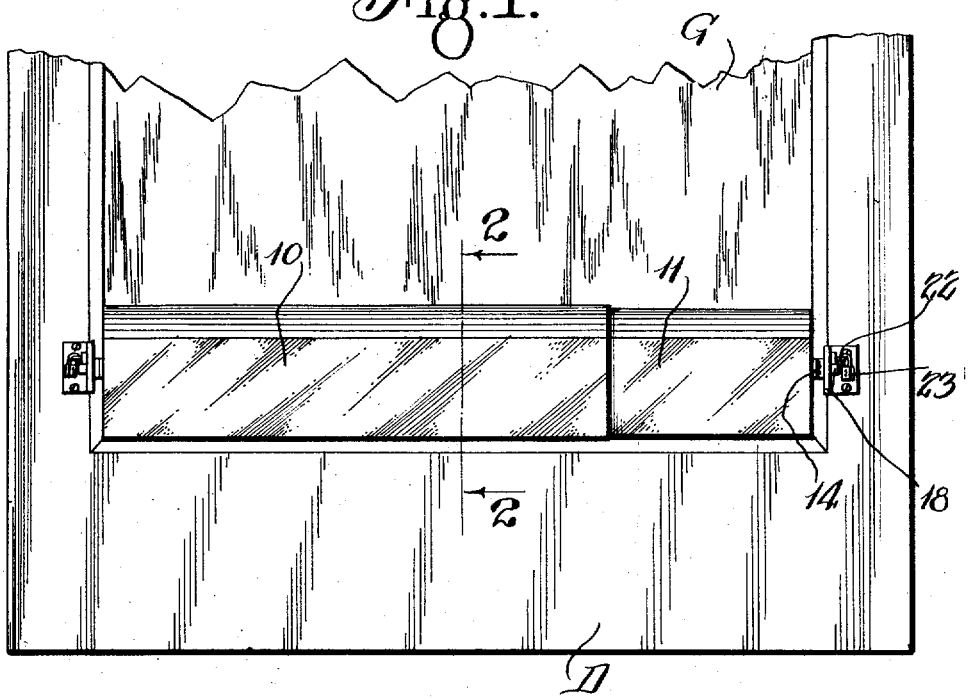
Figure 1 is a view of the inside lower portion of a store door showing the device applied thereto.
Figure 2:
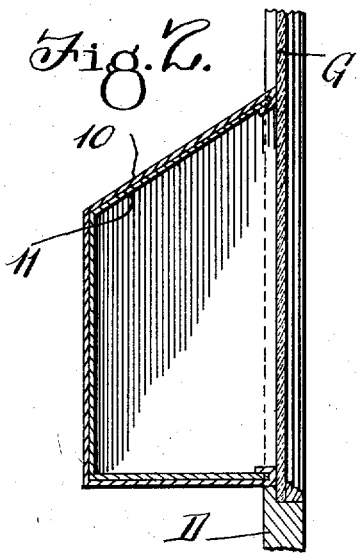
Figure 2 is a section on the line 2—2 of Figure 1.
Figure 3:
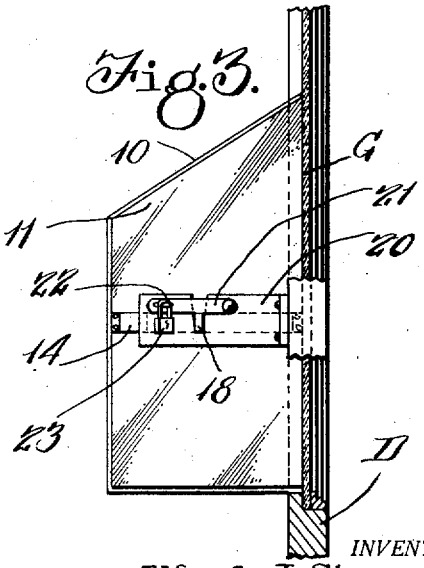
Figure 3 is an end view of the device as applied to the store door, the view being partly broken away.

In all the forms the door is indicated at D and the glass thereof at G. The invention consists of a casing which in the form shown in Figures 1 to 4 inclusive, is formed from a pair of telescopically connected members 10 and 11 which are preferably of trapezoidal cross section, the bottom being flat while the top is inclined. In the form shown in Figures 5 to 8 a similar frame is provided which is not telescopic and is indicated at 12. This frame is closed in by glass panels 13. In both of these forms each end of the casing is provided with a transversely extending member 14 having a slot 15 therein wherethrough passes a bolt 16 by means of which an angle body bracket 17 is slidably mounted on the member 15. This bracket 17 has an end 18 extending outwardly from the end of the casing and this outwardly extending end is fitted in a slot 19 formed in one arm of an angle supporting bracket 20 secured to the side style of the door pivotally mounted on the bracket 20 is a locking arm 21 which engages over the hasp 22, the arm overlying the end 18 and being retained in position by a lock 23. As will be observed from Figures 5 to 8 the glass panels are fitted in channels and are cushioned by rubber cushions 24. Also a rubber pad 25 may be provided on the edges of the open side of the casing thus preventing the introduction of dust or moisture to the goods displayed.

It is obvious that the glass panels may be slidably removed and other panels of different color or character substituted therefor.

It will now be seen that this device may be applied to any door of ordinary construction, no matter what the thickness or width of such door within reasonable limits and the position of the bracket and, in the form shown in Figure 1, the device may be adjusted to fit any glass. Of course, while the device has here been shown as relatively low in comparison to the door it may be made of any height or depth desired.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. A display device for store doors comprising a casing having an open side adapted to fit against the glass of a store door, members extending transversely of said casing at the ends thereof, body brackets slidably mounted on said members and having a portion extending outwardly from the respective ends, and supporting brackets of L-shape each having one arm adapted to be secured to the side style of a door and a second arm slotted to receive the body bracket.

2. A display device for store doors comprising a casing having an open side adapted to fit against the glass of a store door, members extending transversely of said casing at the ends thereof, body brackets slidably mounted on said members and having a portion extending outwardly from the respective ends, supporting brackets of L-shape each having one arm adapted to be secured to the side style of a door and a second arm slotted to receive the body bracket, and locking means associated with the supporting brackets and arranged to retain the body brackets in said supporting brackets.

3. A display device for store doors, windows and the like comprising a casing having an open side adapted to fit against a door or window glass, said casing consisting of a pair of telescopically connected ends, and supporting brackets carried by the ends of said casing and movable transversely thereof toward and from the open side of said casing, said supporting brackets each having a portion extending outwardly from the casing, and fixed brackets adjacent the ends and each having a notch to receive a respective outwardly extending portion.

In testimony whereof I affix my signature.

ALFRED J. STRAUSS.